United States Patent
Mizuno et al.

(10) Patent No.: US 6,796,761 B2
(45) Date of Patent: Sep. 28, 2004

(54) BOLT AND NUT

(75) Inventors: Hiromichi Mizuno, Niwa-gun (JP); Masahiko Hamada, Niwa-gun (JP); Tetsuya Osawa, Niwa-gun (JP); Kazuhiro Aoyama, Niwa-gun (JP); Mitsuru Kozawa, Niwa-gun (JP)

(73) Assignee: Aoyama Seisakusho Co., Ltd., Nagoya (JP)

( * ) Notice: Subject to any disclaimer, the term of this patent is extended or adjusted under 35 U.S.C. 154(b) by 0 days.

(21) Appl. No.: 10/253,040

(22) Filed: Sep. 24, 2002

(65) Prior Publication Data
US 2003/0059275 A1 Mar. 27, 2003

(30) Foreign Application Priority Data

Sep. 25, 2001 (JP) ........................................ 2001-291045
Sep. 20, 2002 (JP) ........................................ 2002-274363

(51) Int. Cl.[7] .............................................. F16B 25/00
(52) U.S. Cl. ...................... 411/386; 411/412; 411/423; 411/426
(58) Field of Search ................................ 411/386, 423, 411/412, 424, 411, 417, 426

(56) References Cited

U.S. PATENT DOCUMENTS 1,939,737 A * 12/1933 Thomson .................... 411/411
2,021,704 A   11/1935 Thatcher et al.
3,266,363 A    8/1966 Bronson et al.
3,878,759 A    4/1975 Carlson
4,179,976 A * 12/1979 Sygnator .................... 411/413
4,621,963 A * 11/1986 Reinwall .................... 411/369
6,120,227 A    9/2000 Murase et al.
6,142,186 A   11/2000 Donovan

* cited by examiner

Primary Examiner—J J Swann
Assistant Examiner—Jori Schiffman
(74) Attorney, Agent, or Firm—Frishauf, Holtz, Goodman & Chick, P.C.

(57) ABSTRACT

A bolt is provided with a head part and a shank part. The shank part includes a first constant diameter cylindrical part, a transition part, a cylindrical connection part, and a second constant diameter cylindrical part concentrically extending from the first constant diameter cylindrical part to the second constant diameter cylindrical part. The first constant diameter cylindrical part has a screw thread with a predetermined pitch formed on the side surface thereof. The transition part has a tapered shape and has a screw thread with a predetermined pitch formed on the side surface thereof. The cylindrical connection part has a diameter smaller than that of the first constant diameter part. The second constant diameter cylindrical part has a diameter smaller than the first constant diameter part, and has a screw thread with a predetermined pitch formed on the side surface thereof. The crest part of the screw thread formed on the side surface of the transition part is truncated.

20 Claims, 16 Drawing Sheets

BOLT AND NUT

BACKGROUND OF THE INVENTION

1. Field of the Invention

The present invention relates to a bolt and a nut preventing seizure and biting in screwing the bolt into the nut.

2. Description of the Related Art

A bolt provided with a guide portion at the tip portion of a bolt shank has been known. Such a bolt is appropriately adjusted an orientation of the bolt with respect to the nut and is able to screw the bolt into the nut even in a case where the bolt is inserted into the nut with their axes not being aligned with each other.

As an example of the above-described bolt, a bolt disclosed in U.S. application Ser. No. 6,120,227 has been known. FIG. 9 illustrates the bolt. In this conventional bolt, a constant diameter cylindrical part 4 with a diameter smaller than a bolt shank 2 is provided at the tip portion of the bolt shank 2 having a screw thread 1 formed thereon via a short tapered inclined part 3. A complete screw thread 5 is formed on the constant diameter cylindrical part 4. In the example illustrated in FIG. 9, an edge tapered part 6 is further provided at the other end of the constant diameter cylindrical part 4.

In general, it is difficult to form a complete screw thread on the tapered inclined part 3 between the bolt shank 2 and the constant diameter cylindrical part 4. Therefore, an incomplete screw thread 9 having a height lower than that of the complete screw thread is likely to form on the inclined part.

As described in FIG. 9, an incomplete screw thread 10 is also formed in an opening of a female screw 7 of the nut. The height of the incomplete screw thread 10 is lower than that of a screw thread 8 of the female screw 7 and the crest thereof is sharper than that of the screw thread 8.

Therefore, when a bolt is inserted into a nut with their axes not being aligned with each other, the incomplete screw thread 9 of the bolt easily bites in the incomplete screw thread 10 of the nut as shown in FIG. 10, and then resulting in the occurrence of the seizure.

SUMMARY OF THE INVENTION

An object of the present invention is to provide a bolt and a nut capable of appropriately adjusting the orientation of the bolt and then fastening the bolt and the nut without fastening defects such as slipping and seizure and the like even when the bolt is obliquely inserted into the nut.

The bolt according to the present invention is a bolt comprising a head part; and a shank part extending from the head part, wherein the shank part comprises a first constant diameter cylindrical part having a first diameter which is constant along the axial direction and having a screw thread with a predetermined pitch formed on the side surface thereof; a transition part having a tapered shape with a diameter gradually decreasing with distance from the head part in the axial direction, concentrically extending from the tip portion of the first constant diameter cylindrical part, and having a screw thread with a predetermined pitch on the side surface thereof; a cylindrical connection part having a diameter smaller than the first diameter in the axial direction and concentrically extending from the tip portion of the transition part; and a second constant diameter cylindrical part having a second diameter which is constant and smaller than the first diameter in the axial direction, concentrically extending from the tip portion of the cylindrical connection part, and having a screw thread with a predetermined pitch on the side surface thereof, and a crest of the screw thread formed on the side surface of the transition part is truncated.

Since the crest of the thread screw formed on the side surface of the transition part is truncated, the biting between the screw thread of the nut and the screw thread formed on the transition part can be prevented even when the bolt is inserted into the nut with their axes not being aligned with each other. Accordingly, it is possible to appropriately adjust an orientation of the bolt with respect to the nut. In addition, since the orientation of the bolt can be appropriately adjusted, it is possible to easily screw the bolt.

DESCRIPTION OF THE PREFERRED EMBODIMENTS

Hereinafter, preferred embodiments of the present invention will be described with reference to the accompanying drawings.

Figure 1:
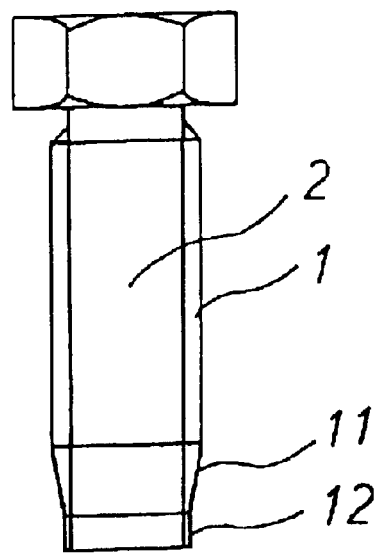
FIG. 1 is a front view showing a bolt according to the first embodiment of the present invention.
Figure 2:
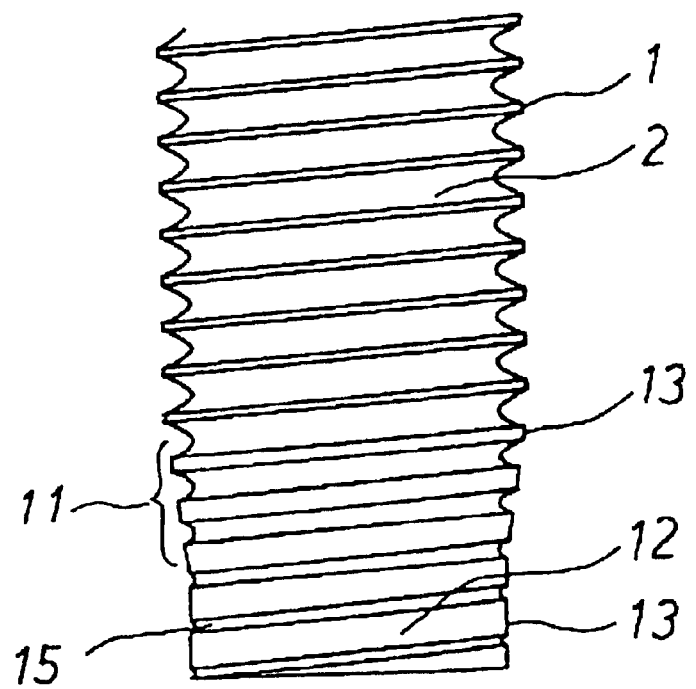
FIG. 2 is a partially enlarged view of the bolt shown in FIG. 1.

FIGS. 1 and 2 show the bolt according to the first embodiment of the present invention. The bolt has a bolt shank 2, an inclined part 11, and a constant diameter cylindrical part 12. A normal screw thread 1 with a predetermined pitch is formed on the bolt shank 2. The constant diameter cylindrical part 12 with a diameter smaller than that of the bolt shank 2 is provided at a tip portion of the bolt shank 2 via the tapered inclined part 11. The inclined part 11 has a predetermined length in the axial direction, for example, a length 1 to 1.5 times as long as that of the one pitch of the normal screw thread 1. A deformed screw thread 13 is formed on the tapered inclined part 11 with the same pitch as that of the normal screw thread 1 and in such a shape that the crest thereof is truncated. The cross sectional shape of the deformed screw thread 13 in the plane including the axis is approximately trapezoid.

In this embodiment, the deformed screw thread 13 is formed so as to be continuously connected to the screw thread formed on the constant diameter cylindrical part 12 at the tip portion of the bolt. In addition, since the deformed screw thread 13 formed on the constant diameter cylindrical portion 12 is formed so as to have a major diameter a little smaller than the minor diameter of the female screw 7 formed on the nut (refer to FIG. 6) and to have a minor diameter almost equal to that of the screw thread 1, a shallow screw groove 15 is formed on the constant diameter cylindrical part 12.

Figure 3:
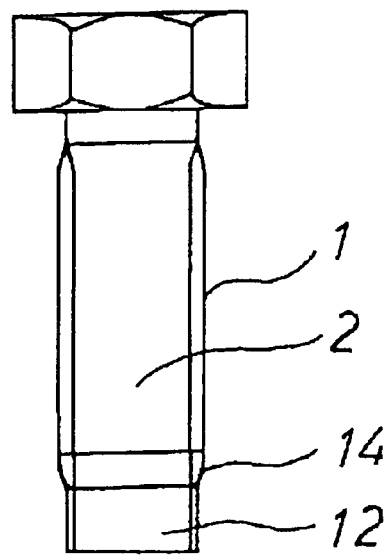
FIG. 3 is a front view showing a bolt according to the second embodiment of the present invention.
Figure 4:
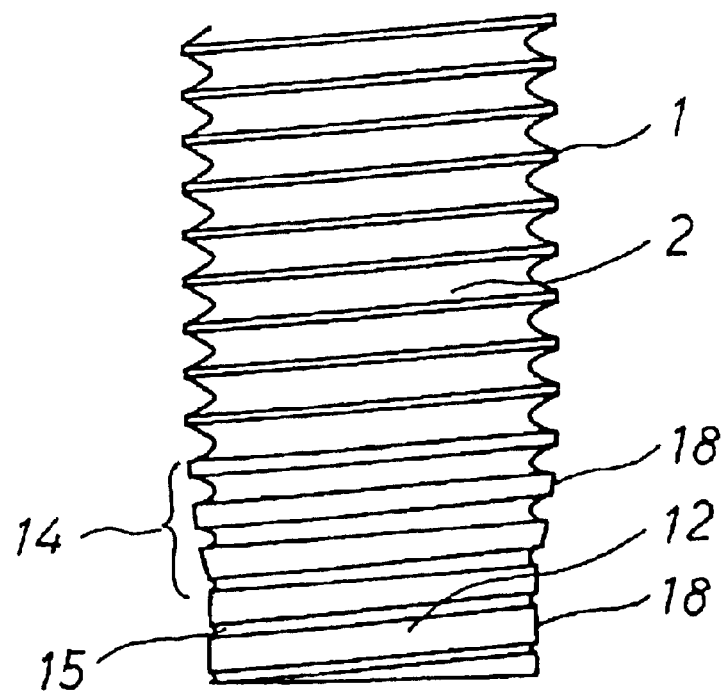
FIG. 4 is a partially enlarged view of the bolt shown in FIG. 3.

FIGS. 3 and 4 show the bolt according to the second embodiment of the present invention. In this bolt according to the second embodiment, an arc-shaped inclined part 14 which is slightly convex outwardly is formed instead of the tapered inclined part 11. A deformed screw thread 18 is formed on the arc-shaped inclined part 14 and the constant diameter cylindrical part 12. It is also possible to use an arc-shaped inclined part which slightly concave inwardly as the arc-shaped inclined part 14.

Figure 5:
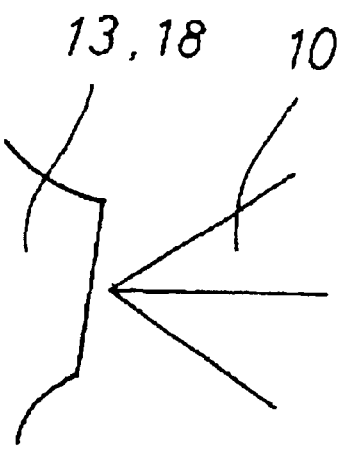
FIG. 5 is an explanatory diagram for biting between a deformed screw thread and an incomplete screw thread.
Figure 6:
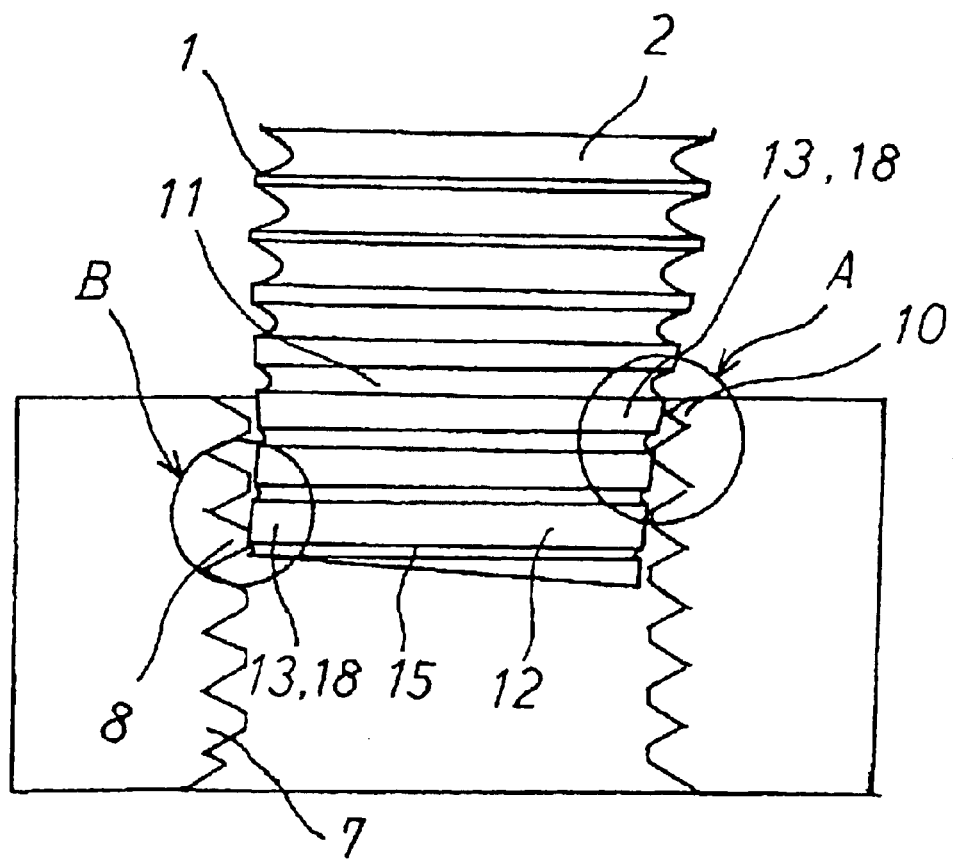
FIG. 6 is a partially sectional view showing a state in which the bolt according to the present invention is obliquely inserted into the nut.

By forming the bolt having the shape as described above, an almost flat part is more widely formed on the crest of the screw thread formed on the tapered inclined part 11 or the arc-shaped inclined part 14 than on the normal screw thread 1. Therefore, even when the bolt is obliquely screwed in the nut, the biting of the deformed screw thread 13 or 18 to the screw thread 10 of the nut can be prevented as shown in FIG. 5. Furthermore, the major diameter of the deformed screw thread 13 or 18 formed on the constant diameter cylindrical part 12 is slightly smaller than the minor diameter of the female screw 7 of the nut. Therefore, it is possible to prevent the large inclination of the bolt with respect to the nut when the bolt is inserted into the nut as shown in FIG. 6. In addition, since the depth of the screw groove 15 provided on the constant diameter cylindrical part 12 is small, even when the screw thread 8 of the female screw 7 screws into the screw groove 15, the bolt is not largely inclined.

In this manner, even when the bolt is screwed in the state as shown in FIG. 6, the screw groove 15 of the constant diameter cylindrical part 12 moves along the female screw 7 of the nut, and the orientation of the bolt is appropriately adjusted. Since the orientation of the bolt is appropriately adjusted, when the bolt is further screwed, the normal screw threat 1 of the bolt shank 2 and the female screw 7 of the nut can be appropriately fitted.

Figure 7:
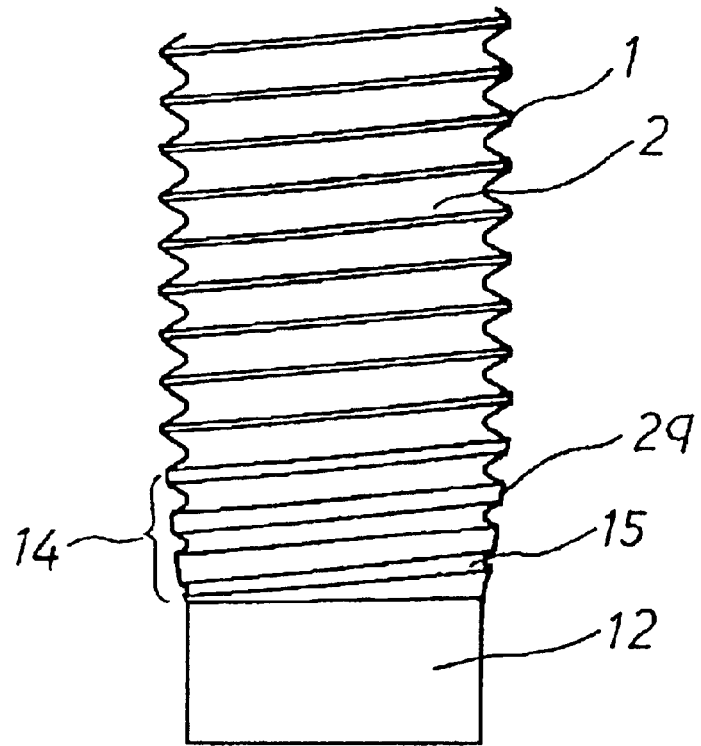
FIG. 7 is a view showing a bolt according to the third embodiment of the present invention.

The bolt according to the third embodiment of the present invention is shown in FIG. 7.

In this third embodiment, no screw thread is formed on the constant diameter cylindrical part 12 formed at the tip portion of the arc-shaped inclined part 14. This constant diameter cylindrical part 12 is formed so as to have the major diameter a little smaller than the minor diameter of the female screw 7. Therefore, the bolt is little inclined when the tip portion thereof is inserted into the nut.

Figure 8:
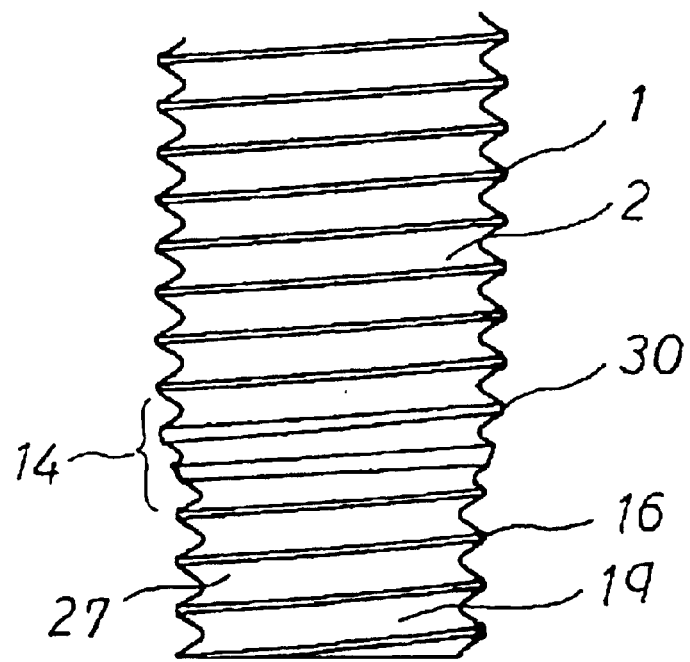
FIG. 8 is a view showing a bolt according to the fourth embodiment of the present invention.
Figure 9:
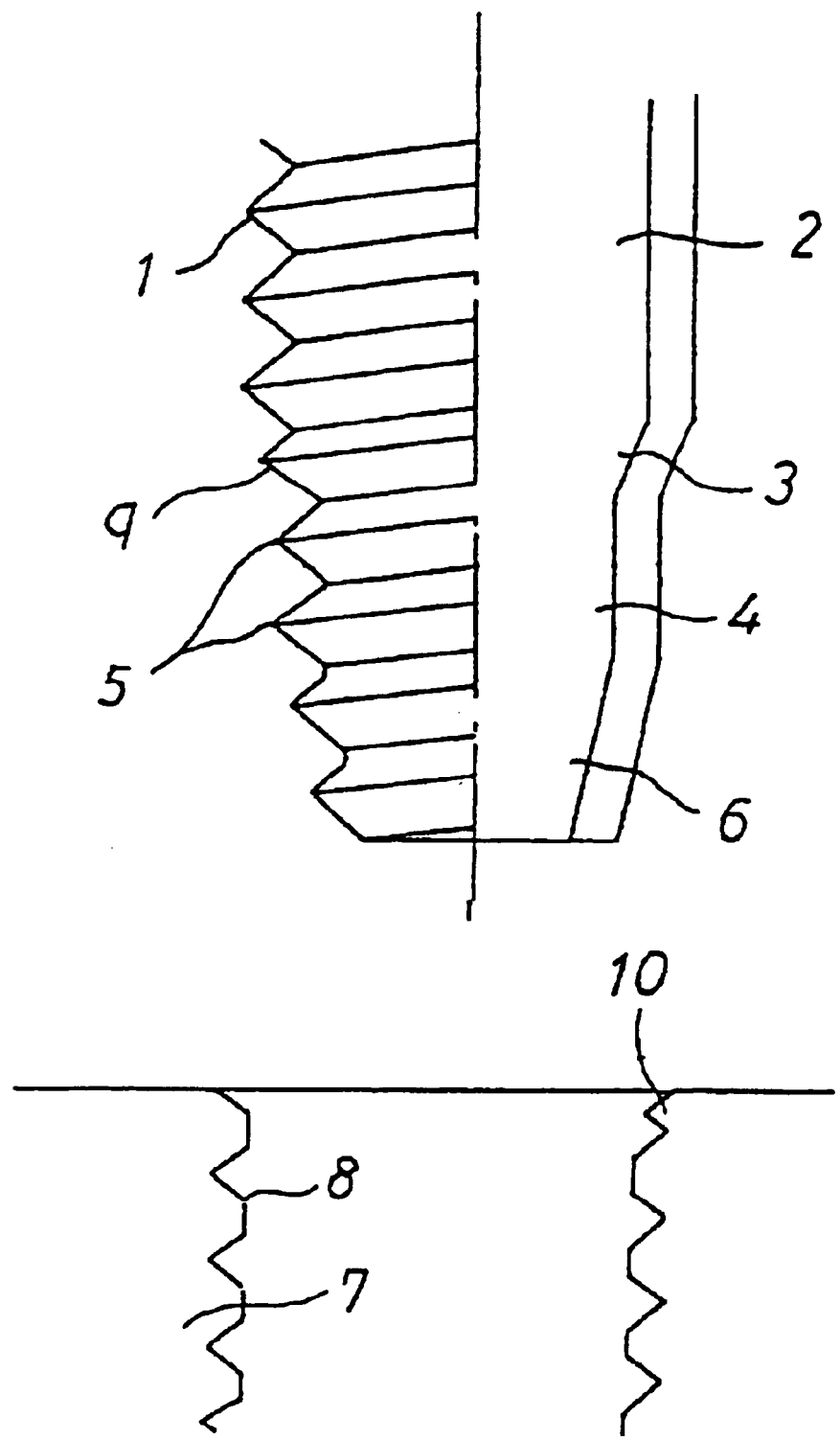
FIG. 9 is a partially sectional view of a tip portion of a conventional bolt and an opening of a nut.
Figure 10:
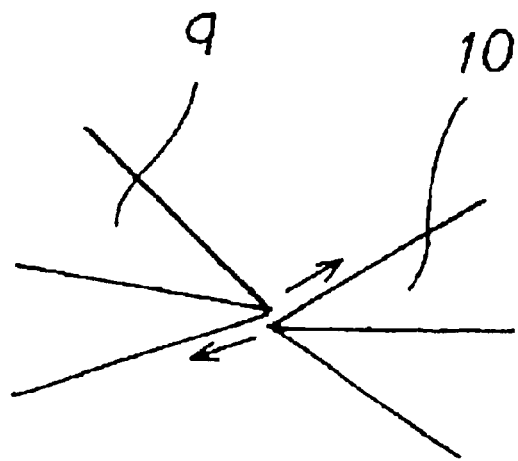
FIG. 10 is an explanatory diagram for biting between an incomplete screws of a conventional bolt and nut.

The bolt according to the fourth embodiment of the present invention is shown in FIG. 8.

In this fourth embodiment, the constant diameter cylindrical part 19 is provided at the tip portion of the arc-shaped inclined part 14. A complete screw thread 16 has a major diameter a little smaller than the minor diameter of the female screw 7 and is formed at the same pitch as that of the normal screw thread 1 on this constant diameter cylindrical part 19. The deformed screw thread 30 is formed on the arc-shaped inclined part 14. Therefore, when the bolt is obliquely inserted into the nut, the biting between deformed screw thread 30 and the incomplete screw thread 10 of the female screw 7 is prevented. Furthermore, even when the bolt is obliquely inserted into the nut and then is tightened, a screw groove 27 between the incomplete screw thread 16 guides the female screw 7 to the normal screw thread 1 of the bolt shank 2. Accordingly, the orientation of the bolt is appropriately adjusted, and the bolt can be precisely screwed in the nut. The above-mentioned arc-shaped inclined part 14 can be changed to the same shape as the tapered-shaped inclined part 14.

Figure 11:
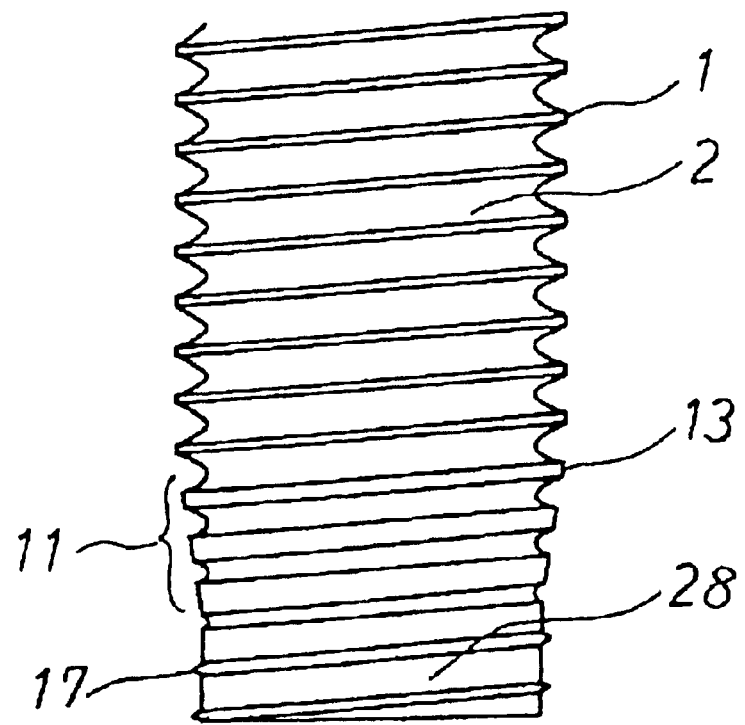
FIG. 11 is a view showing a bolt according to the fifth embodiment of the present invention.

Further, the bolt according to the fifth embodiment of the present invention is shown in FIG. 11.

In this fifth embodiment, a spiral-shaped convex portion 17 is formed on a constant diameter cylindrical part 28 at the tip portion of the tapered inclined part 11. It is possible to appropriately adjust the orientation of the bolt with respect to the nut as in the case of FIG. 6. In this case, the cross sectional shape of the spiral-shaped convex portion 17 can be optionally selected from the square shape, the semicircular shape, and the like in addition to the triangle shape. Furthermore, it is also possible to use the arc-shaped inclined part 14 instead of the tapered inclined part 11.

In the above-mentioned first to fifth embodiments, the tapered shape means straight line shape.

Figure 12:
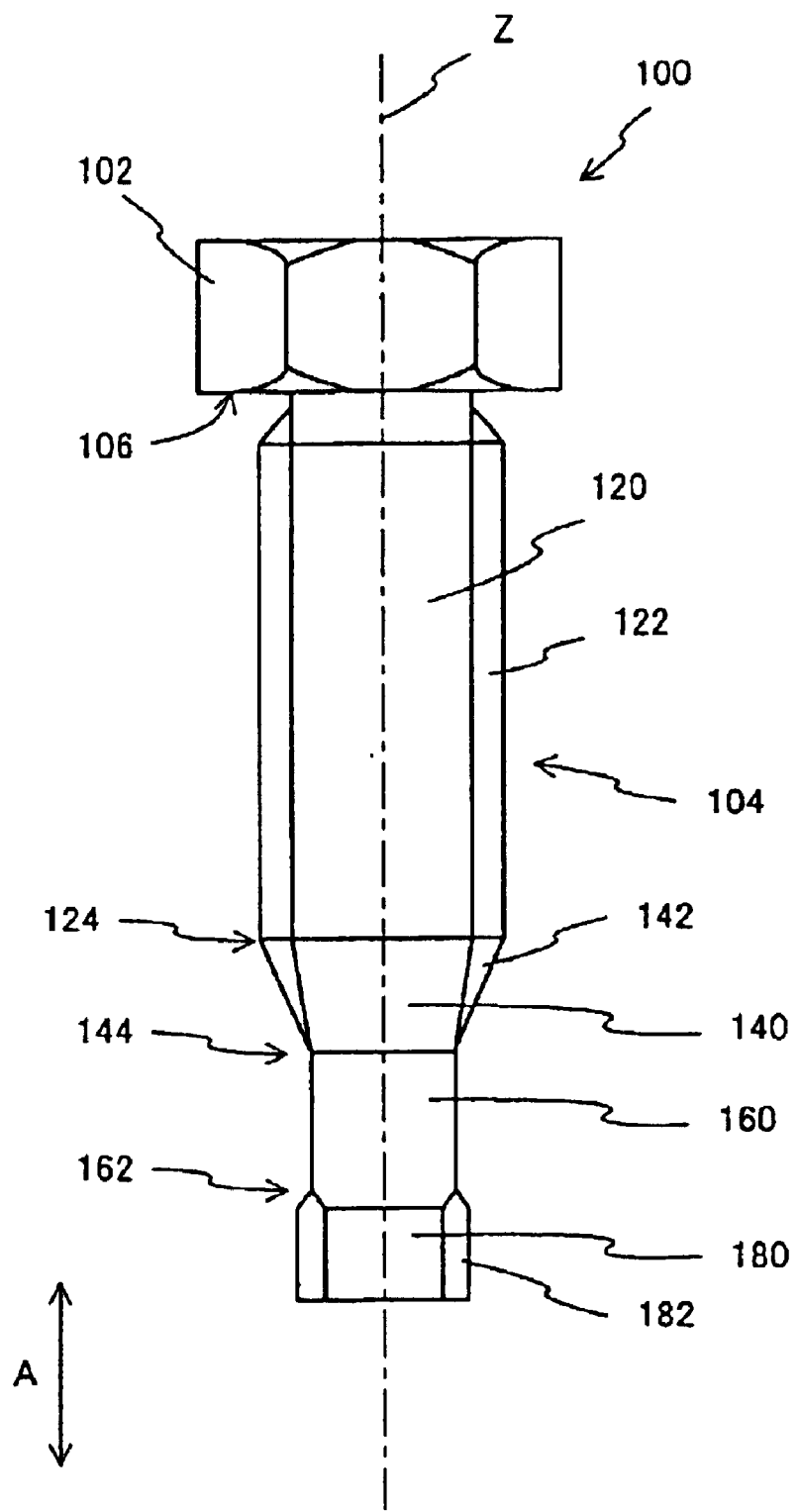
FIG. 12 is a view showing a bolt according to the sixth embodiment of the present invention.
Figure 13:
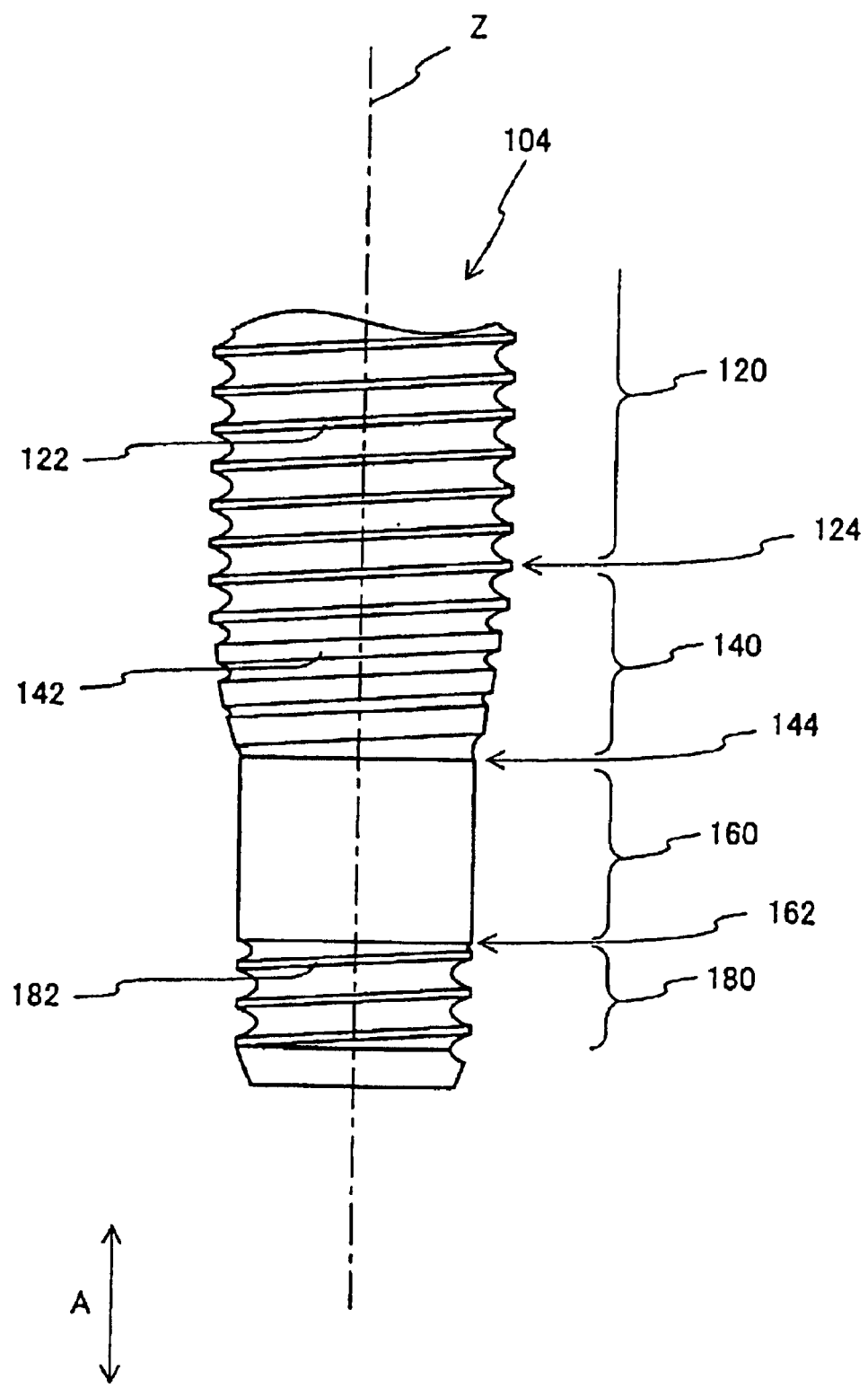
FIG. 13 is a partially enlarged view illustrating the shank part of the bolt shown in FIG. 12.

The bolt according to the sixth embodiment of the present invention is shown in FIGS. 12 and 13. FIG. 12 is a front view showing the entire outline of a bolt 100, and FIG. 13 is a partially enlarged view illustrating the screw thread formed on the shank part.

The bolt 100 shown in FIG. 12 is composed of the head part 102 and the shank part 104.

The shank part 104 includes a first constant diameter cylindrical part 120, a transition part 140, a cylindrical connection part 160, and a second constant diameter cylindrical part 180.

The first constant diameter cylindrical part 120 extends from the head part 102. The first constant diameter cylindrical part 120 is formed in an approximately cylindrical shape with a predetermined first diameter along the axis direction A shown by the arrow in FIGS. 12 and 13. A screw thread 122 with a predetermined pitch as shown in FIG. 13 is formed on the side surface of the first constant diameter cylindrical part 120.

The transition part 140 extends from a tip portion 124 of the first constant diameter cylindrical part 120 concentrically with the first constant diameter cylindrical part 120. The transition part 140 has a tapered shape with a diameter gradually decreasing with distance from the head part 102 in the axial direction A. A screw thread 142 with a predetermined pitch is formed on the side surface of the transition part 140. The screw thread 142 is formed on the entire side surface of the transition part 140 in this sixth embodiment as shown in FIG. 13. However, it is also possible to form the screw thread 142 on a part of the side surface of the transition part 140, for example, only the adjacent region to the first constant diameter cylindrical part 120.

The cylindrical connection part 160 extends from a tip portion 144 of the transition part 140 concentrically with the transition part 140. The cylindrical connection part 160 is formed in an approximately cylindrical shape, with a predetermined constant first diameter along the axial direction. As shown in FIG. 13 no screw thread is formed on the side surface of the cylindrical connection part 160. However, it is also possible to form a screw thread with a predetermined pitch on the side surface of the cylindrical connection part 160.

The second constant diameter cylindrical part 180 extends from a tip portion 162 of the cylindrical connection part 160 concentrically with the cylindrical connection part 160. A screw thread 182 with a predetermined pitch is formed on the side surface of the second constant diameter cylindrical part 180 as shown in FIG. 13.

The pitch of the screw thread 122 of the first constant diameter cylindrical part 120 is the same as that of the screw thread 182 of the second constant cylindrical part 180 in the sixth embodiment. However, these pitches may also be different from each other.

Figure 14:
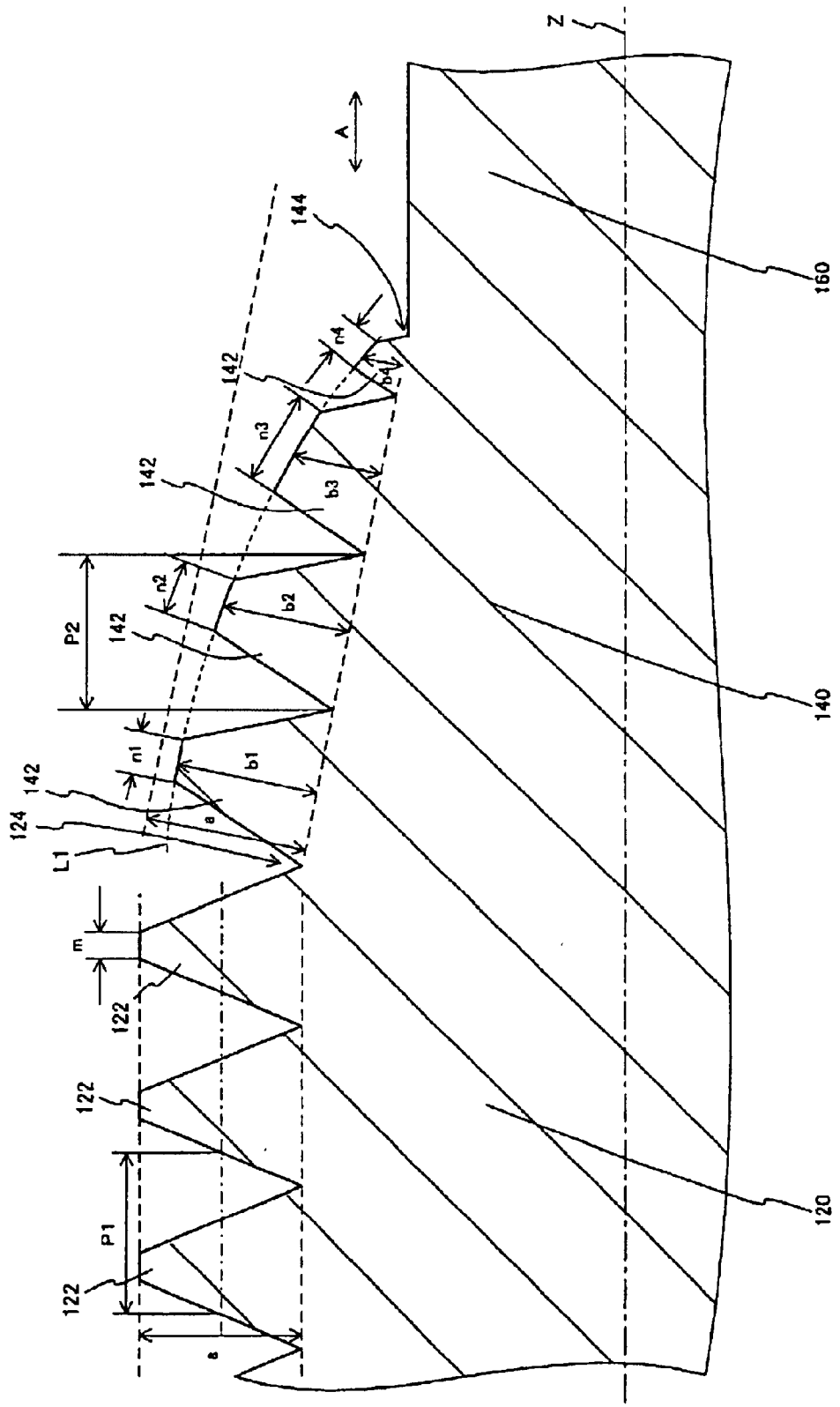
FIG. 14 is an enlarged sectional view illustrating the shank part when the transition part of the bolt shown in FIG. 12 is formed in an arc shape.
Figure 15:
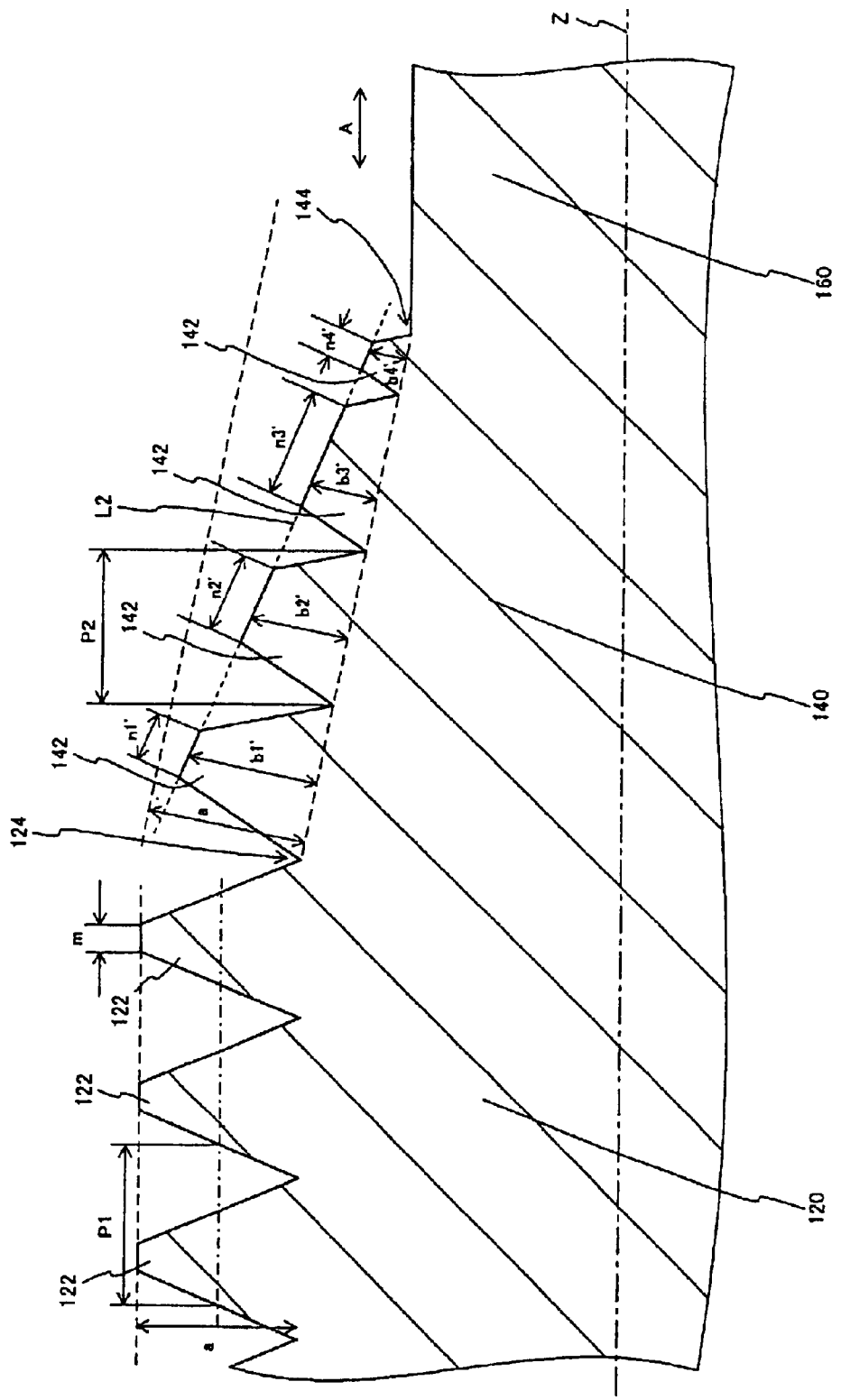
FIG. 15 is an enlarged sectional view illustrating the shank part when the transition part of the bolt shown in FIG. 12 is formed in a linear shape.

FIGS. 14 and 15 are partially enlarged sectional views showing the above-described first constant diameter cylindrical part 120, the transition part 140, and the cylindrical connection part 160. These figures are sectional views taken along the plane in the axial direction A and including the axial line Z.

The screw thread 122 with a pitch P1 and a height a is formed on the first constant diameter cylindrical part 120. On the other hand, the screw thread 142 with a pitch P2 and heights b1, b2, b3, b4, or b1', b2', b3', b4' is formed on the transition part 140 extending from the tip portion 124 of the first constant diameter cylindrical part 120.

In FIGS. 14 and 15, the pitch is the distance between the corresponding two points of adjacent ridges each other measured in parallel to the axial line Z in the section including the axial line. In this case, the pitch of the transition part 140 is P2 as shown in FIGS. 14 and 15.

Furthermore, the height of the screw thread is the distance between the straight line connecting the crests of the ridge and the straight line connecting the roots measured perpendicularly to the straight line connecting the roots in a sectional shape including the axial line of the screw thread. In FIG. 14, the heights of the screw thread 142 formed on the side surface of the transition part 140 are b1, b2, b3 and b4, and in FIG. 15, the heights of that are b1', b2', b3' and b4'.

Furthermore, the lengths of crest of the screw thread 142 on the transition part 140 in the cross section including the axial line Z are n1, n2, n3 and n4 in FIG. 14, or n1', n2', n3' and n4' in FIG. 15. The screw thread 142 is formed on the transition part 140 so that these lengths are longer than the length m of the crest in the cross section including axial line Z of the screw thread 122 of the first constant diameter cylindrical part 120. The crest means the surface at the top of the ridge connecting its both side flanks, and the flank means the surface connecting crest and the root.

In the examples shown in FIGS. 14 and 15, the screw thread 142 is formed on the transition part 140 so that the heights of the screw thread b1, b2, b3 and b4, or b1', b2', b3' and b4' are gradually decreased with distance from the head part 102 (refer to FIG. 12), more specifically, in the lateral direction of FIGS. 14 and 15.

In the example shown in FIG. 14, the line L1 obtained by connecting the crests of the screw thread 142 formed on the side surface of the transition part 140 is a curved line. Moreover, in the example shown in FIG. 15, line L2 may also be a straight line.

In the examples shown in FIGS. 14 and 15, the heights of the screw thread 142 formed on the transition part 140 b1, b2, b3 and b4, or b1', b2', b3' and b4' are simply decreased with distance from the head part 102 (refer to FIG. 12). However, it is also possible to form the screw thread to have a simply increasing height. Furthermore, it is possible to form the screw thread with a height changed in combination with the increase and decrease, and also, it is possible to form the screw thread with a height changed randomly.

Figure 16:
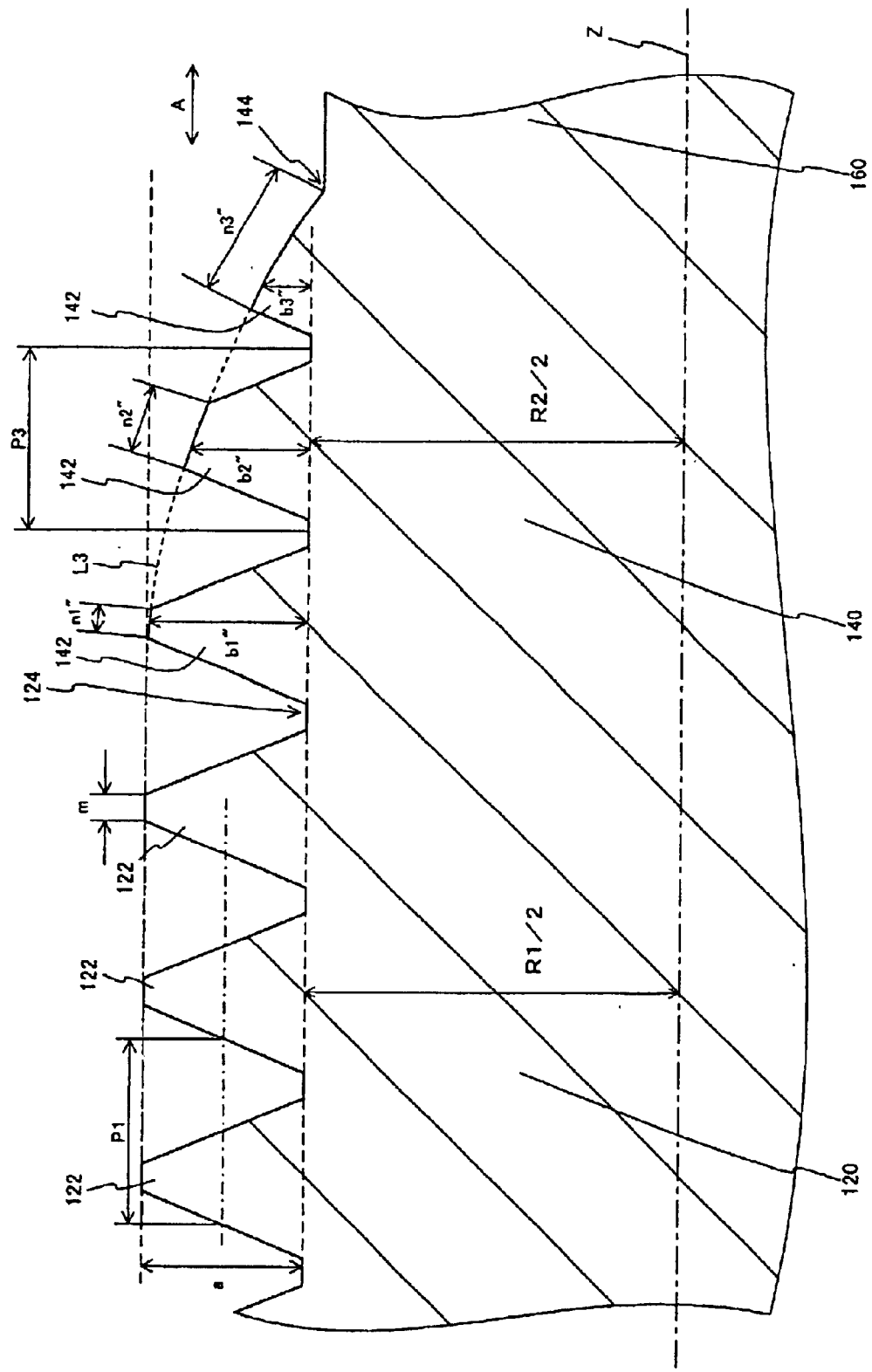
FIG. 16 is an enlarged sectional view of the other embodiment of the bolt shown in FIG. 12.

FIG. 16 is a partially enlarged sectional view according to other embodiment of the first constant diameter cylindrical part 120, the transition part 140 and the cylindrical connection part 160. FIG. 16 is a sectional view in cross section including the axial line Z as in the case of FIG. 14 or 15.

In FIG. 16, the minor diameter R2 of the screw thread 142 on the transition part 140 is the same as the minor diameter R1 of the screw thread 122 on the first constant diameter cylindrical part 120. The minor diameter is the diameter of imaginary cylinder tangential to the root of mail thread. The radius of the root of the screw thread 122 is represented by R1/2 and that of the screw thread 142 is represented by R2/2 in FIG. 16.

The screw thread 122 with a pitch P1 and a height a is formed on the first constant diameter cylindrical part 120. On the other hand, the screw thread 142 with a pitch P3 and heights b1", b2" and b3" is formed on the transition part 140 extending from tip portion 124 of the first constant diameter cylindrical part 120.

The pitch is the distance between the corresponding two points of adjacent ridges each other measured in parallel to the axial line Z in the section including the axial line Z. The height is the distance between the straight line connecting the crests ridges and the straight line connecting the roots measured perpendicularly to the axial line Z in the section including the axial line Z.

Lengths of crest of the screw thread 142 on the transition part 140 in the cross section including the axial line Z are n1", n2" and n3" in FIG. 16. The screw thread 142 is formed on the transition part 140 so that these lengths are longer than the length m of the crest of the screw thread 122 of the first constant diameter cylindrical part 120 in the section including axial line Z as in the case of FIG. 14 or 15. In FIG. 16, the crest is the surface at the top of the ridge connecting its both flanks, and the flank is the surface connecting the crest and the root.

In FIG. 16, the screw thread 142 is formed on the transition part 140 so that the heights of the screw thread b1", b2" and b3" are gradually decreased with distance from the head part 102 (refer to FIG. 12), more specifically, in the lateral direction of FIG. 16.

In the example shown in FIG. 16, the line L3 obtained by connecting the crests of the screw thread 142 formed on the side surface of the transition part 140 is a curved line. Moreover, the line L3 may also be a straight line.

As shown in FIG. 14, 15, and 16, the screw thread 142 of the transition part 140 is formed in the shape like that obtained by truncating the crest of a complete screw thread such as the screw thread 122 of the first constant diameter cylindrical part 120 by a predetermined height. Since the crest of the screw thread is truncated as described above, the length of the crest in the cross section of the screw thread 142 of the transition part 140 is larger than that of the complete screw thread.

The bolt according to the present invention can be manufactured by the form rolling process by preparing a blank on which no screw thread is formed. The bolt shown in FIG. 14, 15 or 16 can be manufactured by the manner in which the shape of blank corresponding with the transition part 140 and/or the shape of rolling die make a change as appropriate.

Figure 17:
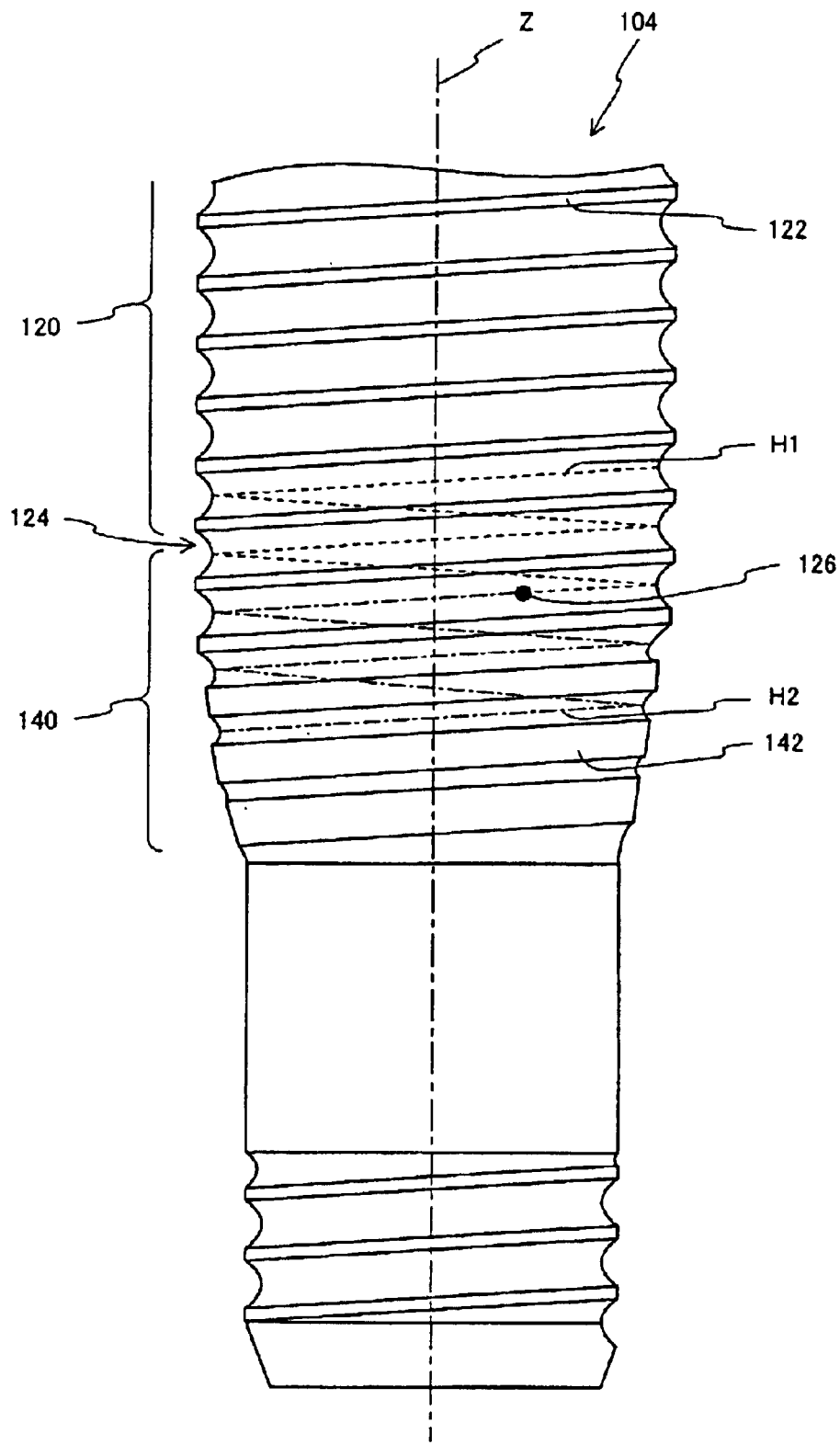
FIG. 17 a front view showing the first helix of the bolt shown in FIG. 12.

A helix H1 of the screw thread 122 formed on the side surface of the first constant diameter cylindrical part 120, and a helix H2 of the screw thread 142 formed on the transition part 140 are shown in FIG. 17. In this specification, the helix mentioned above means the locus of a point of which ratio of the travel in axial direction to the rotary angle around the axial line is constant. In FIG. 17, the helix H1 is represented by a dashed line, and the helix H2 is represented by a chain line. Moreover, FIG. 17 shows only the helixes H1 and H2 in the vicinity of the tip portion 124 of the first constant diameter cylindrical part 120, and the helixes in the other region is omitted.

In the example shown in FIG. 17, the line along the root of the screw thread 122 formed on the side surface of the first constant diameter cylindrical part 120 and the line along the root of the screw thread 142 formed on the side surface of the transition part 140 are shown as an example of the helix. The screw threads 122 and 142 are formed so that the helix H1 and H2 are connected to each other at a point 126 in FIG. 17.

Figure 18:
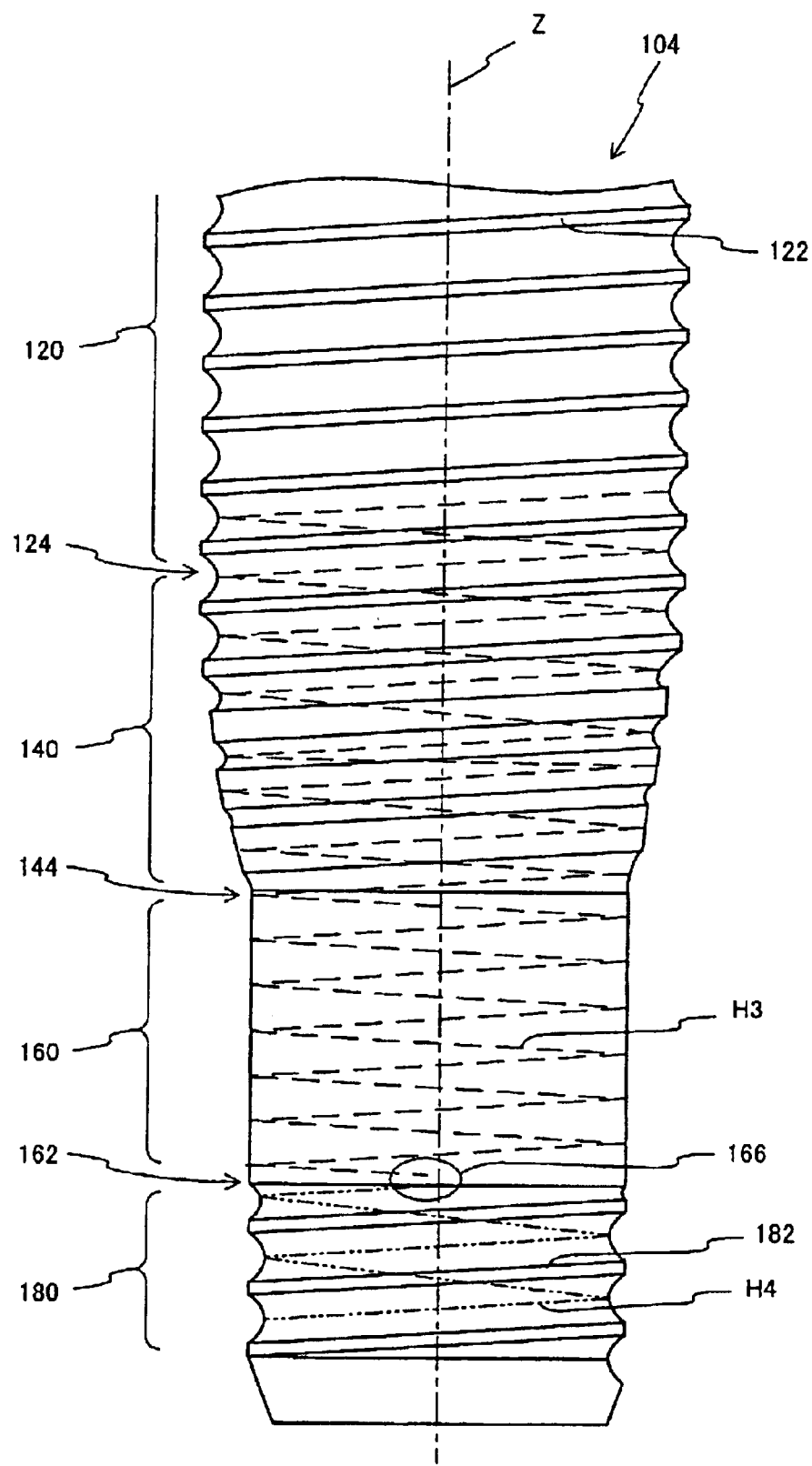
FIG. 18 is a front view showing the first and second helixes of the bolt shown in FIG. 12.

In addition, FIG. 18 shows an imaginary helix H3 obtained on assumption that the helix of the screw thread 122 formed on the side surface of the first constant diameter cylindrical part 120 is extended and the screw thread is formed on the side surfaces of the transition part 140 and the cylindrical connection part 160 and a helix H4 of the screw thread 182 formed on the second constant diameter cylindrical part 180.

In FIG. 18, the imaginary helix H3 along the root of the screw thread 122 formed on the side surface of the first constant diameter cylindrical part 120 is represented by a dashed line, and the helix H4 along the root of the screw thread 182 formed on the second constant diameter cylindrical part 180 is represented by a chain double-dashed line. In the bolt according to the present invention, the screw threads 142 and 182 are formed so as not to continuously connect the imaginary helix H3 and helix H4 as shown in a region 166 enclosed by the heavy line in FIG. 18. The screw threads 142 and 182 may also be formed so as to continuously connect the imaginary helix H3 and helix H4.

When the bolt according to the sixth embodiment is inserted into a part such as a nut on which a female screw is formed, the biting of the screw thread can be prevented similarly to the case shown in FIG. 5. Furthermore, since the biting of the screw thread can be prevented, the orientation of the bolt 100 can be appropriately adjusted, and thus, it becomes possible to easily screw the bolt 100 into the nut 260 as the case of the FIG. 6.

The transition part and the second constant diameter cylindrical part in the sixth embodiment correspond to the inclined part and the constant diameter cylindrical part in the first to fifth embodiments respectively.

Figure 19:
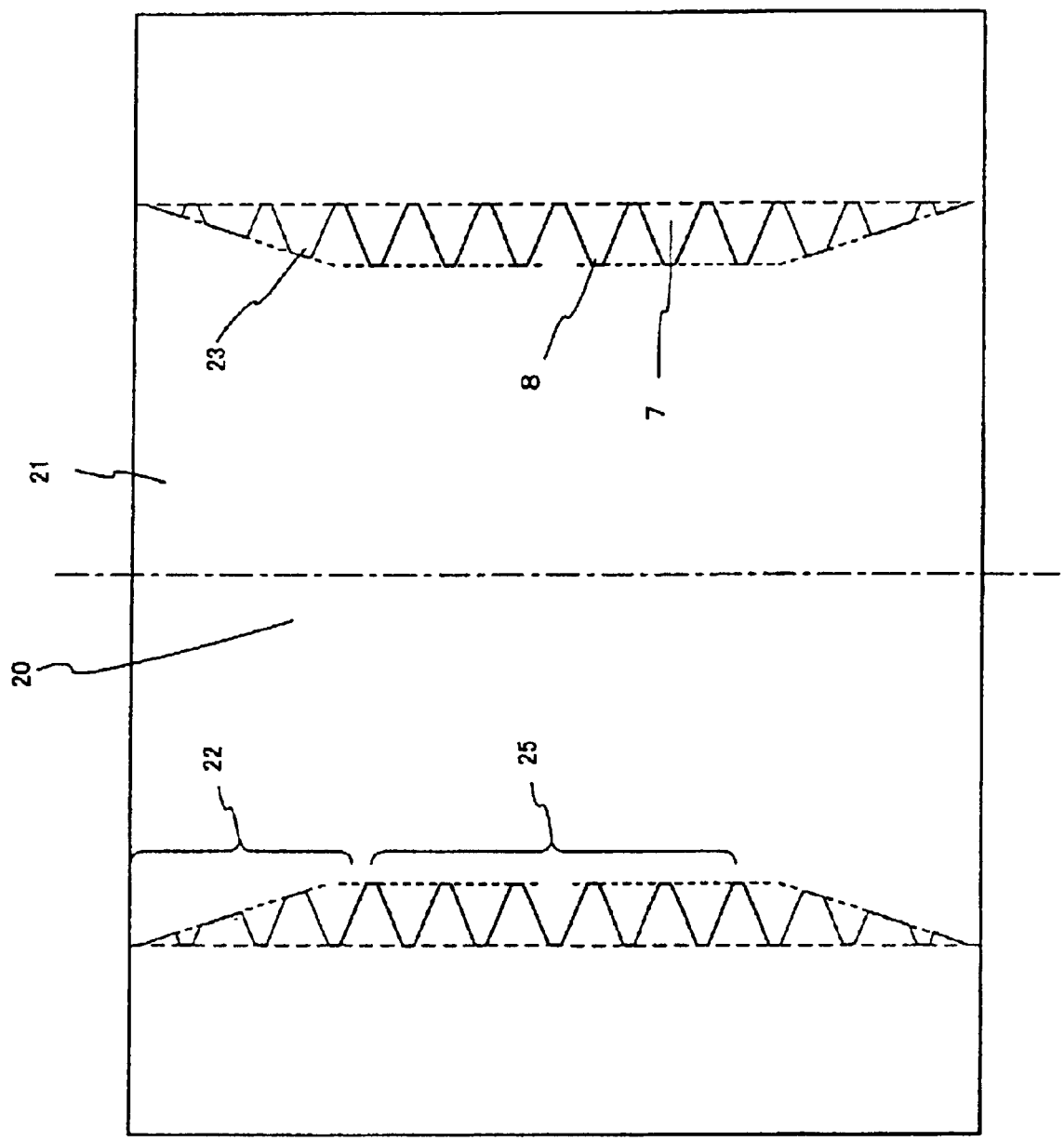
FIG. 19 is a sectional view of a nut according to the first embodiment of the present invention.

FIG. 19 shows the nut according to the first embodiment of the present invention. A screw hole 20 is formed in this nut. A tapered varying diameter part 22 that is linearly chamfered is formed in the vicinity of an opening 21 of the screw hole 20. This varying diameter part 22 has a minor diameter gradually decreasing with distance from the opening 21 of the screw hole, and a screw thread 23 with a predetermined pitch is formed on the varying diameter part 22. In addition, the screw hole 20 includes a constant diameter screw thread part 25 adjacent to the varying diameter part 22, on which a screw thread 8 with a predetermined pitch is formed, and having an approximately constant minor diameter.

The screw thread 23 formed on the above-described varying diameter part 22 is designed so that a length in the axial direction on the crest of the screw thread 23 is larger than that on the top of the screw thread 8 in the axial direction formed on the constant diameter screw thread part 25.

Figure 20:
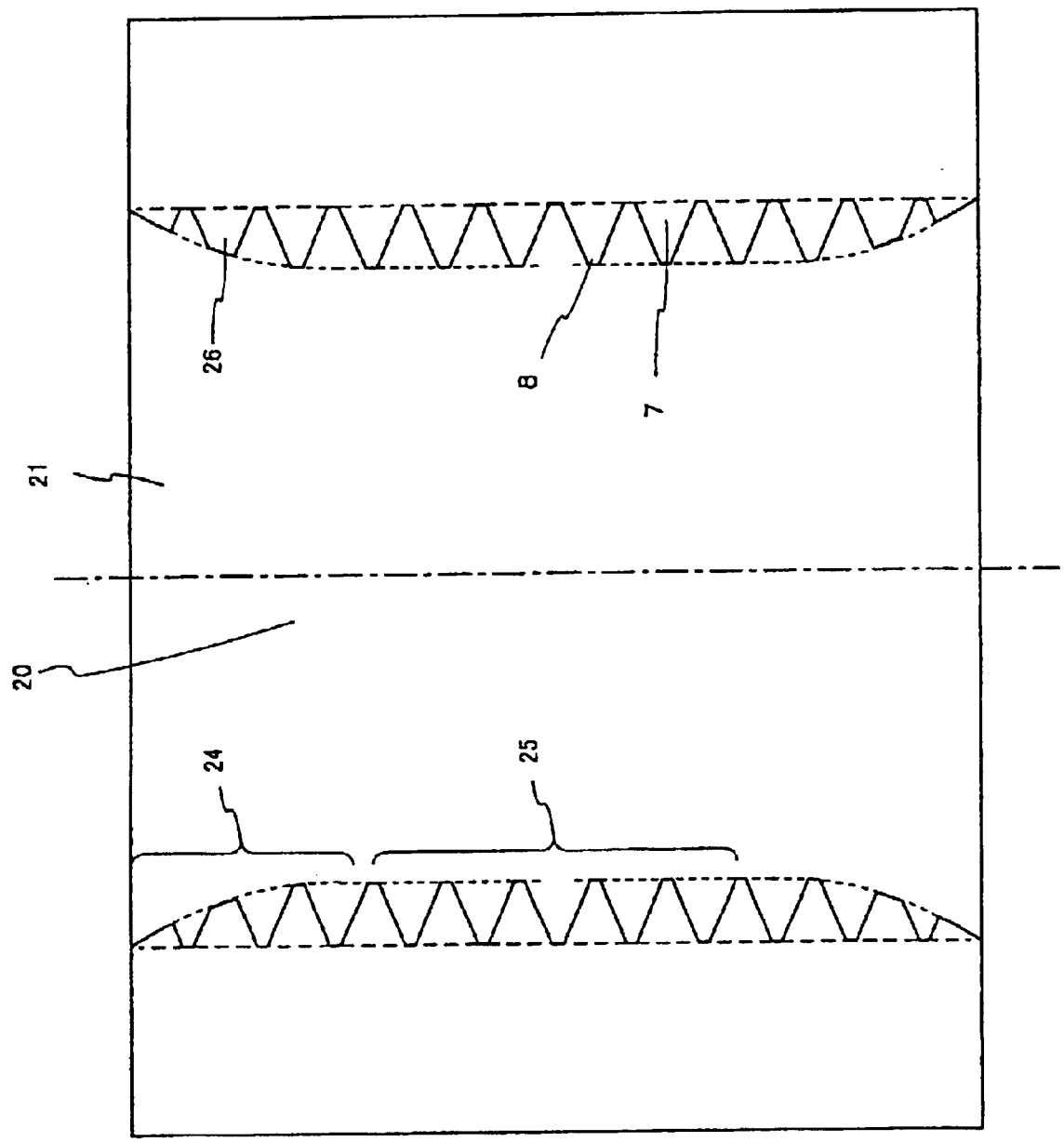
FIG. 20 is a sectional view of a nut according to the second embodiment of the present invention.

FIG. 20 shows the nut according to the second embodiment of the present invention.

A varying diameter part 24 in an arc shape which is slightly convex inwardly is formed in the vicinity of an opening 21 of the screw hole 20. The varying diameter part 24 has an minor diameter gradually decreasing with distance from the opening 21 of the screw hole, and a screw thread 26 with a predetermined pitch is formed on the varying diameter part 24. Moreover, the screw hole 20 includes a constant diameter screw thread part 25 adjacent to the varying diameter part 24, on which the screw thread 8 with a predetermined pitch is formed, and having an approximately constant minor diameter. The screw thread 26 formed on the above-described varying diameter part 24 is designed so that a length in the axial direction on the top of the screw thread 26 is larger than that on the top of the screw thread 8 in the axial direction formed on the constant diameter screw thread part 25.

The varing diameter part is formed in the vicinity of the both opening 21 (upper side and lower side) of the screw hole 20. The varing diameter part may also be formed in the vicinity of only one opening 21 to which the bolt is inserted.

Figure 21:
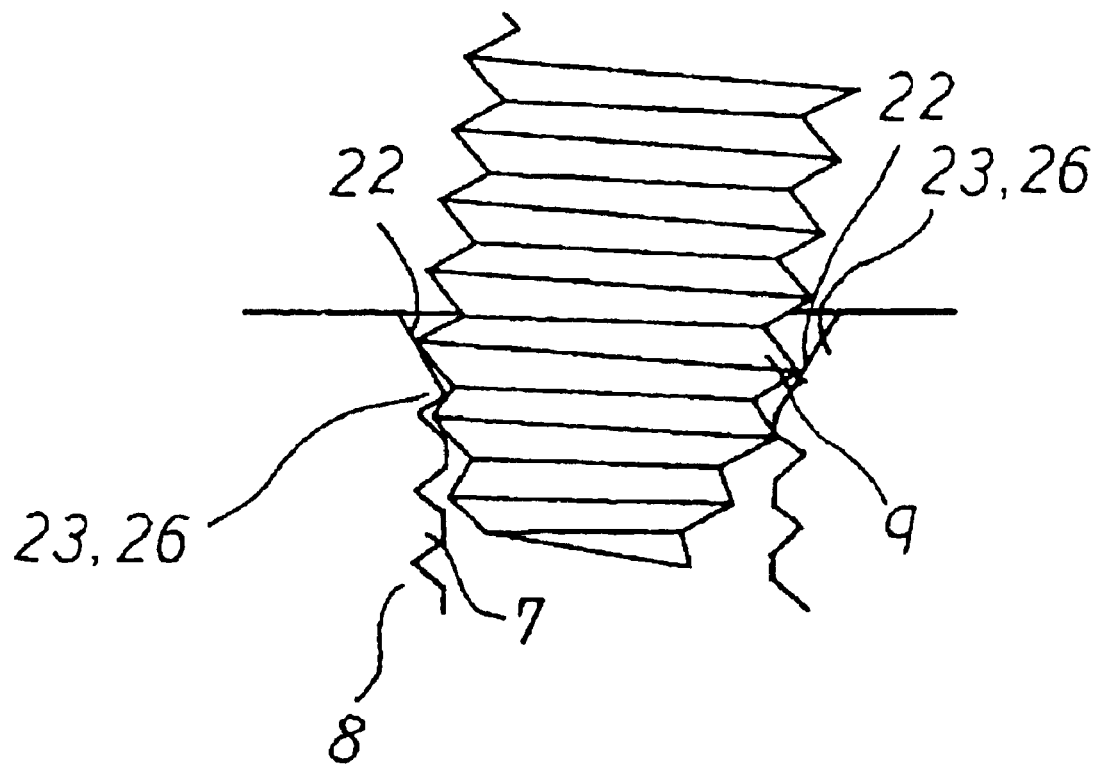
FIG. 21 is a partially sectional view showing the state in which the bolt is obliquely inserted into the nut according to the present invention.

Even when a bolt is obliquely inserted into the nut shown in FIGS. 19 and 20 as shown in FIG. 21, it is possible to prevent the seizure and the biting between the screw thread 23 or 26 of the varying diameter part 24 and the incomplete screw thread 9 of the bolt. Furthermore, even if the bolt is obliquely inserted into the nut and then tightened, the orientation of the bolt can be appropriately adjusted, and thus, it is possible to appropriately screw the bolt into the nut.

Even when a bolt according to the present invention is inserted into a nut with their axial line not being aligned with each other, it is possible to prevent the biting between the screw thread formed on the transition part and the screw thread of the nut. The orientation of the bolt can be appropriately adjusted with respect to the nut by the screw thread formed on the second constant diameter cylindrical part. In addition, since the orientation of the bolt can be appropriately adjusted, it is possible to easily screw the bolt.

What is claimed is:

1. A bolt for alignment with a female thread member comprising:
    a head part; and
    a shank part extending from the head part,
    wherein the shank part comprises:
        a first constant diameter cylindrical part having a first constant diameter along an axial direction, and having a screw thread with a predetermined pitch formed on a side surface thereof;

a transition part having a tapered shape with a diameter gradually decreasing with distance from the head part in the axial direction, concentrically extending from a tip portion of the first constant diameter cylindrical part, and having a screw thread with a predetermined pitch on a side surface thereof;

an unthreaded cylindrical connection part having a diameter smaller than the first constant diameter in the axial direction and concentrically extending from a tip portion of the transition part; and a second constant diameter cylindrical part having a second constant diameter smaller than the first constant diameter in the axial direction, concentrically extending from a tip portion of the cylindrical connection part, and having a screw thread with a predetermined pitch on a side surface thereof;

wherein an end surface of the bolt shank opposite to the head part is substantially perpendicular to the axial direction and substantially flat;

wherein a crest part of the screw thread formed on the side surface of the transition part is truncated; and wherein when being screwed into the female thread member, an advance direction of the shank part is adapted to be changed by contact of the screw thread formed on the side surface of the transition part or the side surface of the second constant diameter cylindrical part with a female thread of the female thread member.

2. The bolt according to claim 1, wherein, in a cross section along the axial direction and including an axis of the shank part, a line obtained by connecting the crests of the screw thread formed on the transition part is one of a curved line and a straight line.

3. The bolt according to claim 1, wherein no screw thread is formed on a side surface of the cylindrical connection part.

4. The bolt according to claim 1, wherein the pitch of the screw thread formed on the first constant diameter cylindrical part is substantially equal to the pitch of the screw thread formed on the second constant diameter cylindrical part.

5. The bolt according to claim 1, wherein a first helix of the screw thread formed on the first constant diameter cylindrical part is continuously connected to a helix of the screw thread formed on the transition part.

6. The bolt according, to claim 1, wherein an imaginary helix is not continuously connected to a second helix of the screw thread formed on the second constant diameter cylindrical part, said imaginary helix being obtained by extending a line defined by a first helix of the screw thread formed on the first constant diameter cylindrical part continuously along the side surface of the transition part and the side surface of the cylindrical connection part.

7. The bolt according to claim 1, wherein an outer diameter of the screw thread formed on the second constant diameter cylindrical part is smaller than an inner diameter of the female thread of the female thread member.

8. The bolt according to claim 1, wherein a side surface of the tip portion concentrically extending from the tip portion of the second constant diameter cylindrical part comprises a side surface without threads or holes.

9. The bolt according to claim 1, wherein the end surface of the bolt shank opposite to the head part comprises a tip end surface of the second constant diameter cylindrical part.

10. The bolt according to claim 1, wherein the end surface of the bolt shank opposite to the head part comprises a tip end surface of a tip portion extending from a tip portion of the second constant diameter cylindrical part.

11. A bolt for alignment with a female thread member comprising:

a head part; and a shank part extending from the head part, wherein the shank part comprises:

a first constant diameter cylindrical part having a first constant diameter along an axial direction, and having a screw thread with a predetermined pitch formed on a side surface thereof;

a transition part having a tapered shape with a diameter gradually decreasing with distance from the head part in the axial direction, concentrically extending from a tip portion of the first constant diameter cylindrical part, and having a screw thread with a predetermined pitch on a side surface thereof;

an unthreaded cylindrical connection part having a diameter smaller than the first constant diameter in the axial direction and concentrically extending from a tip portion of the transition part; and a second constant diameter cylindrical part having a second constant diameter smaller than the first constant diameter in the axial direction, concentrically extending from a tip portion of the cylindrical connection part, and having a screw thread with a predetermined pitch on a side surface thereof;

wherein an end surface of the bolt shank opposite to the head part is substantially perpendicular to the axial direction and substantially flat;

wherein a length in the axial direction of a crest of the screw thread formed on the transition part is longer than a length in the axial direction of a crest of the screw thread formed on the first constant diameter cylindrical part; and wherein when being screwed into the female thread member, an advance direction of the shank part is adapted to be changed by contact of the screw thread formed on the side surface of the transition part or the side surface of the second constant diameter cylindrical part with a female thread of the female thread member.

12. The bolt according to claim 11, wherein, in a cross section along the axial direction and including an axis of the shank part, a line obtained by connecting the crests of the screw thread formed on the transition part is one of a curved line and a straight line.

13. The bolt according to claim 11, wherein no screw thread is formed on a side surface of the cylindrical connection part.

14. The bolt according to claim 11, wherein the pitch of the screw thread formed on the first constant diameter cylindrical part is substantially equal to the pitch of the screw thread formed on the second constant diameter cylindrical part.

15. The bolt according to claim 11, wherein a first helix of the screw thread formed on the first constant diameter cylindrical part is continuously connected to a helix of the screw thread formed on the transition part.

16. The bolt according to claim 11, wherein an imaginary helix is not continuously connected to a second helix of the screw thread formed on the second constant diameter cylindrical part, said imaginary helix being obtained by extending a line defined by a first helix of the screw thread formed on the first constant diameter cylindrical part continuously along the side surface of the transition part and the side surface of the cylindrical connection part.

17. The bolt according to claim 11, wherein an outer diameter of the screw thread formed on the second constant diameter cylindrical part is smaller than an inner diameter of the female thread of the female thread member.

18. The bolt according to claim 11, wherein a side surface of the tip portion concentrically extending from the tip portion of the second constant diameter cylindrical part comprises a side surface without threads or holes.

19. The bolt according to claim 11, wherein the end surface of the bolt shank opposite to the head part comprises a tip end surface of the second constant diameter cylindrical part.

20. The bolt according to claim 11, wherein the end surface of the bolt shank opposite to the head part comprises a tip end surface of a tip portion extending from a tip portion of the second constant diameter cylindrical part.

* * * * *